US009247295B2

(12) United States Patent
Cowgill

(10) Patent No.: US 9,247,295 B2
(45) Date of Patent: *Jan. 26, 2016

(54) AUTOMATED PLAYLIST GENERATION

(75) Inventor: Clayton Neil Cowgill, Vancouver, WA (US)

(73) Assignee: NORTH STAR INNOVATIONS INC., Costa Mesa, CA (US)

(*) Notice: Subject to any disclaimer, the term of this patent is extended or adjusted under 35 U.S.C. 154(b) by 1782 days.

This patent is subject to a terminal disclaimer.

(21) Appl. No.: 11/732,737

(22) Filed: Apr. 4, 2007

(65) Prior Publication Data
US 2007/0183742 A1 Aug. 9, 2007

Related U.S. Application Data

(63) Continuation of application No. 10/208,456, filed on Jul. 29, 2002, now Pat. No. 7,228,054.

(51) Int. Cl.
*H04N 21/454* (2011.01)
*H04N 21/482* (2011.01)
*G11B 27/00* (2006.01)
*G11B 27/10* (2006.01)
*G11B 27/34* (2006.01)
*H04N 7/16* (2011.01)
*H04N 21/258* (2011.01)

(52) U.S. Cl.
CPC ............ *H04N 21/454* (2013.01); *G11B 27/002* (2013.01); *G11B 27/102* (2013.01); *G11B 27/105* (2013.01); *G11B 27/34* (2013.01); *H04N 7/16* (2013.01); *H04N 21/25891* (2013.01); *H04N 21/4825* (2013.01); *G11B 2220/2545* (2013.01); *G11B 2220/2562* (2013.01); *G11B 2220/61* (2013.01)

(58) Field of Classification Search
CPC ..... H04N 7/163; H04N 7/17336; H04N 7/16; H04N 5/76; H04N 21/4825; G11B 20/10; G11B 20/00086; G11B 20/000869
See application file for complete search history.

(56) References Cited

U.S. PATENT DOCUMENTS

| 5,228,014 | A | 7/1993 | d'Alayer de Costemore d'Arc |
| 5,630,005 | A | 5/1997 | Ort et al. |
| 5,635,989 | A | 6/1997 | Rothmuller |
| 5,808,224 | A | 9/1998 | Kato |

(Continued)

FOREIGN PATENT DOCUMENTS

| EP | 1 063 636 A2 | 12/2000 |
| JP | 4-221489 | 8/1992 |

(Continued)

OTHER PUBLICATIONS

International Search Report for International Application No. PCT/US03/23322, Jul. 16, 2004.

(Continued)

*Primary Examiner* — Tat Chio
(74) *Attorney, Agent, or Firm* — Gary Stanford

(57) ABSTRACT

A device, method, and computer-readable medium for automated playlist generation are disclosed. In an embodiment, user input related to at least a first search criterion and a second search criterion is received at a portable playback device. A playlist is generated at the portable playback device. The playlist includes at least one media file selected based on the first search criterion and the second search criterion.

20 Claims, 2 Drawing Sheets

(56) References Cited

U.S. PATENT DOCUMENTS

| | | |
|---|---|---|
| 5,947,746 A | 9/1999 | Tsai |
| 5,969,283 A | 10/1999 | Looney et al. |
| 5,987,525 A | 11/1999 | Roberts et al. |
| 6,002,394 A | 12/1999 | Schein et al. |
| 6,038,199 A | 3/2000 | Pawlowski et al. |
| 6,128,009 A | 10/2000 | Ohkura et al. |
| 6,225,546 B1 | 5/2001 | Kraft |
| 6,248,946 B1 | 6/2001 | Dwek |
| 6,252,830 B1 | 6/2001 | Hsu |
| 6,278,048 B1 | 8/2001 | Lee |
| 6,289,165 B1 | 9/2001 | Abecassis |
| 6,324,537 B1 | 11/2001 | Moran |
| 6,389,467 B1 | 5/2002 | Eyal |
| 6,423,892 B1 | 7/2002 | Ramaswamy |
| 6,438,315 B1 | 8/2002 | Suzuki et al. |
| 6,446,080 B1 | 9/2002 | Van Ryzin et al. |
| 6,496,802 B1 | 12/2002 | van Zoest et al. |
| 6,571,390 B1 | 5/2003 | Dunn et al. |
| 6,587,835 B1 | 7/2003 | Treyz et al. |
| 6,590,303 B1 | 7/2003 | Austin et al. |
| 6,693,236 B1 | 2/2004 | Gould et al. |
| 6,714,722 B1 | 3/2004 | Tsukidate |
| 6,850,252 B1 | 2/2005 | Hoffberg |
| 6,865,431 B1 * | 3/2005 | Hirota et al. ............. 700/94 |
| 6,865,600 B1 * | 3/2005 | Brydon et al. ............. 709/219 |
| 2001/0033343 A1 * | 10/2001 | Yap et al. ............. 348/734 |
| 2002/0045960 A1 * | 4/2002 | Phillips et al. ............. 700/94 |
| 2002/0046241 A1 * | 4/2002 | Nomura et al. ............. 709/203 |
| 2002/0055934 A1 | 5/2002 | Lipscomb et al. |
| 2002/0087658 A1 * | 7/2002 | Hayashi et al. ............. 709/217 |
| 2002/0087974 A1 * | 7/2002 | Sprague ............. 725/32 |
| 2002/0093886 A1 | 7/2002 | Ijichi et al. |
| 2002/0151327 A1 | 10/2002 | Levitt |
| 2002/0152876 A1 | 10/2002 | Hughes et al. |
| 2002/0171567 A1 | 11/2002 | Altare et al. |
| 2002/0188399 A1 * | 12/2002 | Odagawa et al. ............. 701/202 |
| 2002/0194260 A1 | 12/2002 | Headley et al. |
| 2003/0086699 A1 | 5/2003 | Benyamin et al. |
| 2003/0180032 A1 | 9/2003 | Barde et al. |

FOREIGN PATENT DOCUMENTS

| | | |
|---|---|---|
| JP | 6-103737 | 4/1994 |
| JP | H06-309381 | 6/1996 |
| JP | 10-247356 | 9/1998 |
| JP | 11-175537 | 7/1999 |
| JP | 11-259271 | 9/1999 |
| JP | H11-514482 | 12/1999 |
| JP | H10-289251 | 4/2000 |
| JP | 2000-251486 | 9/2000 |
| JP | 2001-118075 | 4/2001 |
| JP | 2001-202085 | 7/2001 |
| JP | 2001-337960 | 12/2001 |
| JP | 2002-55695 | 2/2002 |
| JP | 2002-055993 | 2/2002 |
| JP | 2002-150664 | 5/2002 |
| WO | WO 97-05616 | 2/1997 |

OTHER PUBLICATIONS

GOGO Engine, Audio TOYBOX, Landport Co., Ltd., www.landport.co.jp.

Japanese Official Action, Notice of Reasons for Refusal, Japanese Patent Application No. 2006-342998, Feb. 10, 2009.

Communication Pursuant to Article 94(3) EPC for Application No. 03771843.4 dated Mar. 25, 2014, Matter No. SIGRIO37/EPC, 7 pages.

Brown, B. et al., "SonicBlue Rio Riot reviewed by PC Magazine", May 7, 2002, Retrieved from <<http://www.web.archive.org/web/20021016125556/http://www.pcmag.com/article2/0,4149,363,00.asp>>, Retrieved on Mar. 18, 2014, 4 pages.

Hansen, S., ". . . und sein Rivale—SonicBlues MP3-Player mit Festplatte", CT Magazin fuer Computer Technik, Heise Zeitschriften Verlag, Hannover, DE, No. 10, May 6, 2002, p. 87.

Nonhoff-Arps, P., "Der Nachfolger—MP3-Recorder mit Festplatte", Retrieved from <<http://www.heise.de/artikel-archiv/ct/2002/10/086@00150@/art01.htm>>, Retrieved on Mar. 17, 2014, 4 pages.

Weigel, R., "First Look: Sonicblue Rio Riot", TechTV—Products & Reviews, Jan. 8, 2002, Retrieved from <<http://web.archive.org/web/20020605223036/http://www.techtv.com/products/consumerelectronics/story/0,23008,3367273,00.htm>>, Retrieved on Mar. 18, 2014, 3 pages.

Trial Decision of Rejection, Japanese Patent Application No. 2006-342998, Jun. 28, 2011, (14 pgs).

* cited by examiner

AUTOMATED PLAYLIST GENERATION

CLAIM OF PRIORITY

The present application claims priority from and is a continuation application of U.S. patent application Ser. No. 10/208,456, filed Jul. 29, 2002, and entitled "AUTOMATED PLAYLIST GENERATION," the content of which is expressly incorporated herein by reference in its entirety.

FIELD OF THE DISCLOSURE

This disclosure relates to digital media devices, more particularly to digital media devices with stored content.

BACKGROUND

Digital media devices include many different types of audio and visual devices that can access and 'play' digital media. Digital audio players, such as those using MP3 (Motion Picture Experts Group, Audio Layer 3) or Windows Media Audio.™., formats access digital content and produce sound. Portable digital video disc (DVD) players access audio and video data from a DVD or a stored file and produce video with sound. Generally, these devices have internal storage in which the content is stored, removable media such as discs, or a mixture of both.

These devices have large quantities of storage, even in the portable configurations. They allow a user to have access to many difference types of content. For example, a digital music player may have hundreds of different tracks, covering different types of music, from opera to pop. Similarly, there may be several different artists, albums, labels, or other categories of music.

For the user, accessing a particular piece of information has largely been a labor-intensive operation with minimal assistance. Typical existing solutions cause the user to single-step through tracks or possibly pick from a list. Even in PC-based applications that let users pre-select music to be loaded on the device the selection process can be time consuming. An 'advanced' solution might allow looking at a list based on a category.

The end result is that the user spends far more time interfacing with the player than is desired. The idea of these types of devices, especially the portable devices, is for the user to enjoy the content, not spend time selecting it. The primary purpose of the device is to play music to the user. When confronted with a significant amount of content to choose from, the user often simply wants to hear music, not fumble about trying to pick and choose what to hear.

The continued popularity of radio and the tendency for people with hundreds of CD's to only listen to what is in a 5-disk changer are good examples of where convenience wins over variety. Therefore, a more programmatic solution to managing digital content for users would be useful.

SUMMARY

An embodiment of the invention is a digital media player. The digital media player includes storage to store media content and a user interface to provide information to a user. The information includes at least one task associated with the media content. The media player also includes a control to allow the user to select at least one task and a processor to perform a task selected by the user.

Another embodiment of the invention is a method of selecting music files based upon predetermined tasks, one of which is selected by the user. The method includes receiving a user input that identifies a predefined task. The method then accesses information associated with media content files and selects those media content files that fall within the predetermined task criteria. The selected media files are then presented to the user, in one embodiment of the invention.

BRIEF DESCRIPTION OF THE DRAWINGS

The invention may be best understood by reading the disclosure with reference to the drawings, wherein.

DETAILED DESCRIPTION OF THE DRAWINGS

Digital media players, such as audio or video players, are often designed with portability in mind. However, even portable models have plenty of storage and processing power. Application of this power and storage can be used to improve the user's interaction with the player. The user can select predefined tasks and with very few inputs select a list of media files to be played, increasing the playtime while decreasing the selection time. This list of media files to be played may be referred to as a playlist, with no limitation on the types of media files being played, or the immediacy of it being played.

Figure 1:
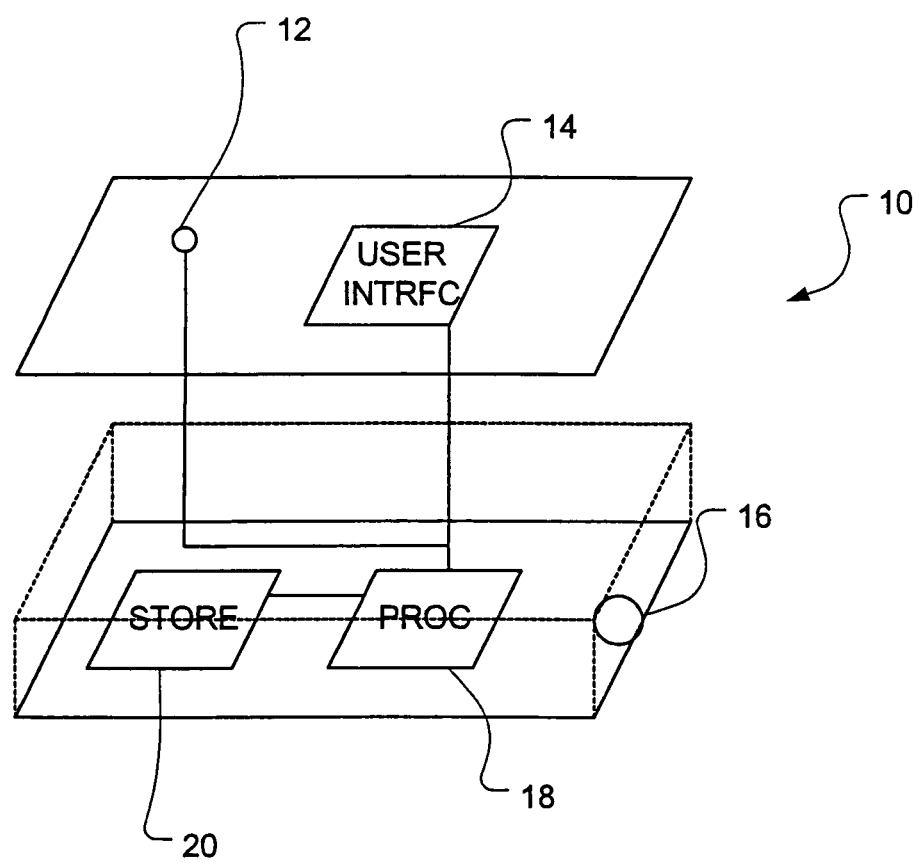
FIG. 1 shows one example of a digital media player, in accordance with and embodiment of the invention.

An example of a digital media player 10 is shown in FIG. 1. The digital media player has a front panel with a control 12 and a user interface display 14. As will be discussed later, the user interface may also include or have as an alternative, an audio user interface, such as an audio output 16. The user interface is used to transmit options to the user, such as audibly over a speaker or visually on the display. The user interface may also be used to present the media content to the user, or a combination of the two may be used. For example, the display screen may be used to present options to the user, functioning as a user interface, and the speaker may be used to present media to the user. In this example, the player would present the media content, in this case music or other audible content, to the user through the speaker. The device could use a user interface such as headphones, but it could also be connected to a home stereo to record the playlist on tape or audio CD and might not actually be 'heard' from the device. The media player also includes a storage 20 in which the media content files and information associated with the media content files is stored, and a processor 18 that receives user inputs, provides information to the user through the user interface and accesses the store according to the user inputs. In accessing the store, the processor may access the media content files or may just access the information associated with the content files to develop the list of media content files.

Figure 2:
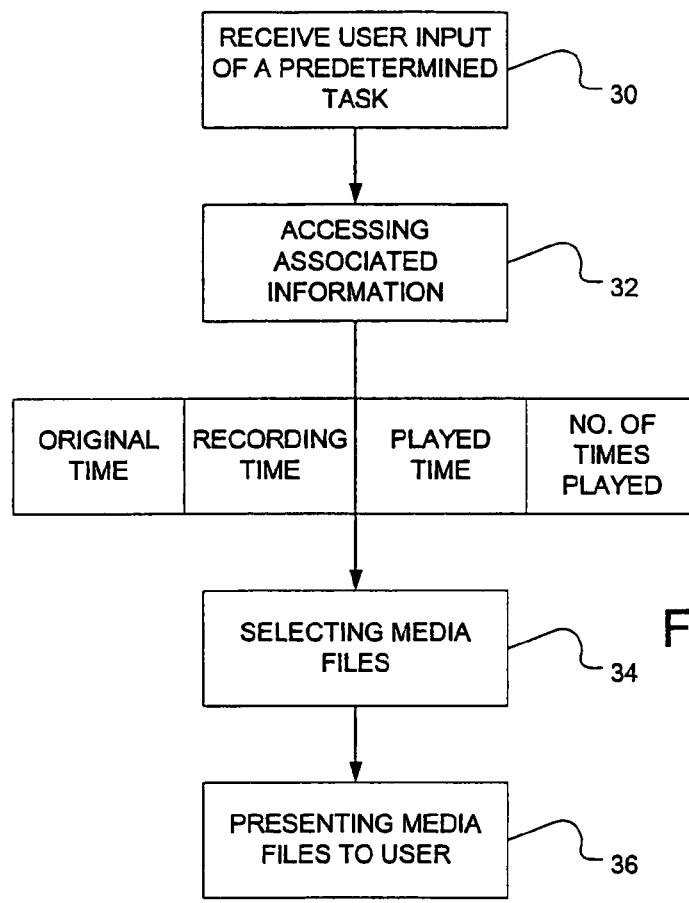
FIG. 2 shows one embodiment of a method of selecting media content files, in accordance with an embodiment of the invention.

FIG. 2 shows an embodiment of a method to select media files, in accordance with the invention. The user selects one of a set of predetermined tasks at 30. The player then accesses information associated with the media content files at 32. The information accessed depends upon the predetermined task selected, as will be discussed in more detail below. The associated information includes, but is not limited to the original time, the recording time, played time and the number of times played. The media files are then selected based upon the predetermined search criteria set out in the predetermined task. Presentation of the media files to the user at 36 may be an optional step. The application of the invention may result in a deferred list that is permanently stored on the device, or used as a seed for another operation.

The predetermined task may have several search criteria and may be automated or require a minimal number of user inputs. The following discussion of several of the predetermined tasks and search criteria is only intended to provide examples and is in no way to limit the scope of the invention.

As shown in FIG. 2, some of the search criteria determined by the selection of a predetermined task include the original time, that is the time the media content file was originally created. In contrast, the recording time is the time that the user actually recorded or transferred the file to the device. The played time is the last time the media file was played, and the number of times played is somewhat self-explanatory. Other search criteria may include principals, where the principal may be a singer, composer, songwriter or musical group for a music file, for example, or an actor, director, producer or screenwriter for a video file. Again these are only examples and are not intended to be exclusive or exhaustive lists of options.

Using the recording time, for example, the user can select a predetermined task of 'new music' or 'new movies.' This would allow the user to hear or see movies that they have recently acquired, where the recording date would be used. The length of the 'new' period could be input by the user, or even selected off a pull down menu, such as 'week,' 'month,' 'three month' time periods. The search criteria would then cause the player to access the information associated with the content files and produce a list of content files that had been acquired in the last month, for example. The files having a recording time during a time period between the current time stamp and the current time stamp minus the selected interval would be accessed.

The played time tracks the last time and date a file was played. For ease of discussion the term 'time' as used here will include time, date or both. The user then could decide to access the files that have not been played in a certain amount of time. "Play me files I haven't experienced in the last 6 months,' would result in the processor searching the associated information for files that have a playing time before a certain date. The certain date would be the current time stamp minus 6 months, in this example.

In addition to a particular date used as the threshold, the user could select dates that fall within a range. For example, the user may want to hear all tracks, or watch all clips, the originated in a particular year, such as 1984. The user may select this task and designate the time period as an additional input. The player would then access the associated information, searching for all files with an original date within that range and create the list.

Similar to selecting files from a particular period, the user may designate one or more principals. As discussed above, the user may designate a music group, a songwriter, a director, an actor, etc., as well as combinations of principals. For example, the user could designate all clips featuring Tom Hanks and Meg Ryan.

The player will track and store the number of times a particular file has been played. If the player were to sort the files by the number of times played, the user or the player could designate a number of times above which the file would be designated as a 'favorite.' Alternatively, the player or the user could designate a predetermined number of files, such as the top 40, or other number, of most-frequently accessed files.

More sophisticated measure may be used as well. For example, a weighting may be assigned to the number of times played, where the weighting may take into account the proximity of the most recent time the file was played when compared with the current time. For example, a user may have played a music file over a hundred times more than any other file, but the last time it was played was three months ago. Obviously, this is not the current 'favorite' file of the user, but a strict number of times played analysis would lead to that conclusion. Many other possibilities for weighting and manipulating the data for the 'favorites' list exist.

In addition to these, several other search criteria could be set up in predetermined tasks. Similarly, the player could present combinations of these and other criteria. For example, 'play all the music of the 1960's that I have not listened to in the last six months,' or 'show me all the clips of Tom Hanks that do not include Meg Ryan.' All of these examples discussed above provide the user with some control, while reducing the selection time required by the user. It is also possible to reduce the selection time by the user with implementation of more automated search criteria.

For example, the user could just select a feature that allows the player to make the selections. In essence the feature would provide an algorithmic representation of a radio disc jockey or movie jockey. The player would select a mix of familiar files, which may include files related to the tastes of the user, and some mostly random files to provide an interesting mix. One possible implementation uses the 'favorites' list as a seed for a list of automatically generated selections.

Figure 3:
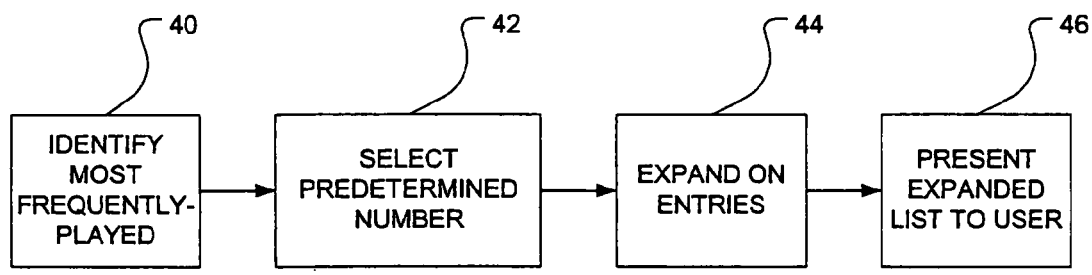
FIG. 3 shows one embodiment of a method of selecting media content files based upon an automated task, in accordance with an embodiment of the invention.

An embodiment of an automated playlist generation method is shown in FIG. 3. At 40, the original seed list of favorites is determined, in whatever manner the user or the player desires. A predetermined number of entries for the new list may be decided upon at 42, but this process is optional. The entries in the seed list are then expanded upon, by one of several techniques, examples of which are given below. The expanded list is then presented to the user, again either as a deferred list or a list for immediate play at 46.

The player may perform the expansion of the entries based upon its own preprogramming or based upon a one-time user input. Several options for expansion exist. The player could examine some top number of favorite files and add one to the playlist. The player could select one of the favorites and find another file from the same album, or program or DVD, and add it to the list. Similarly, the player could select another file based upon the genre, or the same principal. The player could add time periods, such as a file selection based upon one of the above criteria that has not been played in the last day or week or month. A completely random file selection could be added to the list. All of these approaches could be implemented separately on a predetermined number of favorite files, or they could all be implemented in one playlist, with each subsequent file be operated on by a different expansion technique.

In this manner, the user's interaction with the player for selecting files would be minimal and the user's interaction with the player for experiencing and enjoying the files would be increased. Additionally, without the need for the user to navigate huge lists of files and menus, the user interface display screen could be reduced, thereby reducing the power consumption and the size of the player or the part of the screen for the user interface. In the case of music players, the size may even be eliminated and the system switched over to a voice interface, with the user interacting with the player through voice commands.

While digital media players in general, and portable digital media players in particular, benefit from application of this invention, it may be applicable to other types of media players. The invention could be applied to removable media, such as multiple-disc CD changers. As storage capacity increases and it becomes possible to hold thousands of hours of 3D and video data, these same techniques may be applied.

Thus, although there has been described to this point a particular embodiment for a method and apparatus for automated playlist generation, it is not intended that such specific references be considered as limitations upon the scope of this invention except in-so-far as set forth in the following claims.

What is claimed is:

1. A method comprising:
   receiving, at a portable playback device, user input related to at least a first search criterion and a second search criterion;
   selecting at least one media file based on the first search criterion and the second search criterion;
   generating, at the portable playback device, a playlist indicating media files configured to be played at the portable playback device, the media files including the at least one media file selected based on the first search criterion and the second search criterion;
   automatically selecting, by the portable playback device, a second media file based on a third search criterion that is different from the first search criterion and the second search criterion, wherein the third search criterion is selected by the portable playback device, and wherein the playlist further indicates the second media file; and
   providing a representation of the playlist at the portable playback device.

2. The method of claim 1, wherein the third search criterion is selected based on the at least one media file.

3. The method of claim 2, wherein the third search criterion includes a source album, a source program, a source DVD, a genre, a principal, or a time period.

4. The method of claim 1, wherein at least one of the first search criterion and the second search criterion indicates a media type, and wherein the media type is audio or video.

5. The method of claim 1, wherein the first search criterion indicates audio, and wherein the second search criterion includes selection of an artist, an album, a song, a genre, or a composer.

6. The method of claim 1, wherein the first search criterion indicates video, and wherein the second search criterion includes selection of an actor, a director, a producer, or a screenwriter.

7. The method of claim 1, wherein the second search criterion includes one of an artist, an album, a song, a genre, a composer, an actor, a director, a producer, or a screenwriter, and wherein a fourth search criterion includes a different artist, a different album, a different song, a different genre, a different composer, a different actor, a different director, a different producer, or a different screenwriter.

8. The method of claim 1, wherein the second search criterion is a frequency of playback at the portable playback device.

9. The method of claim 1, wherein the third search criterion indicates favorite media files.

10. An apparatus comprising:
    a portable playback device comprising:
      a memory to store media files;
      an interface configured to receive user input, the user input to include at least a first criterion and a second criterion, wherein at least one of the first criterion and the second criterion indicates recency of playback of stored media files at the portable playback device;
      logic to select playlist files from the media files based on the first criterion and the second criterion;
      logic to generate a playlist that includes the playlist files, the playlist files configured to be played at the portable playback device;
      logic to automatically select a first media file of the media files based on a third criterion that is different from the first criterion and the second criterion, wherein the third criterion is selected by the portable playback device, and wherein the playlist further includes the first media file; and
      a display.

11. The apparatus of claim 10, wherein the playlist determines a playback sequence of at least a portion of the media files stored at the memory.

12. The apparatus of claim 10, wherein at least one of the first criterion and the second criterion indicates a media type, and wherein the media type is audio or video.

13. The apparatus of claim 10, wherein the second criterion includes an artist, an album, a song, a genre, a composer, an actor, a director, a producer, or a screenwriter.

14. The apparatus of claim 10, further comprising logic to cause the display to display a representation of the playlist.

15. The apparatus of claim 10, wherein the playlist files are added to the playlist at least partially based on a date that the media files are received at the portable playback device.

16. The apparatus of claim 10, wherein the playlist files are added to the playlist at least partially based on a date of last playback of the media files at the portable playback device.

17. A non-transitory computer-readable medium comprising instructions to cause a processor of a portable playback device to:
    receive at least a first search criterion and a second search criterion at the portable playback device, wherein at least one of the first search criterion and the second search criterion indicates recency of playback of stored media files at the portable playback device;
    select at least one media file based on the first search criterion and the second search criterion;
    generate, at the portable playback device, a playlist indicating media files configured to be played at the portable playback device, the media files including the at least one media file selected based on the first search criterion and the second search criterion;
    automatically select, by the portable playback device, a second media file based on a third search criterion that is different from the first search criterion and the second search criterion, wherein the third search criterion is selected by the portable playback device, wherein the playlist further indicates the second media file, wherein the third search criterion is selected based on the at least one media file, and wherein the third search criterion indicates favorite media files; and
    store the playlist at the portable playback device.

18. The non-transitory computer-readable medium of claim 17, wherein at least one of the first search criterion and the second search criterion indicates a media type, and wherein the media type is audio or video.

19. The non-transitory computer-readable medium of claim 17, wherein the instructions further cause the processor to determine the favorite media files, wherein the favorite media files are determined based on a frequency of playback of the stored media files at the portable playback device, wherein the second search criterion indicates the favorite media files, and wherein the at least one media file includes at least one of the favorite media files, wherein the favorite media files are determined based on a weighting of attributes of a plurality of media files stored on the portable playback device, and wherein the attributes include the frequency of playback of the plurality of media files and recency of playback of the plurality of media files.

20. The non-transitory computer-readable medium of claim 17, wherein the second search criterion includes a selection of a principal, and wherein the principal is a singer, a musical group, or an actor.

\* \* \* \* \*